(12) United States Patent
Choi et al.

(10) Patent No.: US 9,114,727 B2
(45) Date of Patent: Aug. 25, 2015

(54) SYSTEM AND METHOD OF ASSISTING DRIVER IN DRIVING ELECTRIC VEHICLE IN MORE ENVIRONMENTALLY EFFICIENT MANNER

(75) Inventors: Seunggil Choi, Yongin-si (KR); Jeong Woo Lee, Suwon-si (KR); Jung Do Kee, Seoul (KR); Chae Mo Yang, Gunpo-si (JP)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 394 days.

(21) Appl. No.: 13/587,122

(22) Filed: Aug. 16, 2012

(65) Prior Publication Data

US 2013/0151047 A1    Jun. 13, 2013

(30) Foreign Application Priority Data

Dec. 9, 2011 (KR) .................. 10-2011-0132280

(51) Int. Cl.
*B60W 10/02* (2006.01)
*B62D 6/00* (2006.01)
*B60L 15/20* (2006.01)

(52) U.S. Cl.
CPC ......... *B60L 15/2045* (2013.01); *B60L 2240/60* (2013.01); *Y02T 10/7283* (2013.01); *Y02T 10/7291* (2013.01); *Y02T 90/161* (2013.01)

(58) Field of Classification Search
CPC .............. Y02T 90/161; B60L 15/2045; B60L 2240/60
See application file for complete search history.

(56) References Cited

U.S. PATENT DOCUMENTS

| | | | |
|---|---|---|---|
| 6,324,469 B1* | 11/2001 | Okude et al. ................. | 701/532 |
| 8,423,214 B2* | 4/2013 | Kshatriya ..................... | 701/22 |
| 2002/0062183 A1* | 5/2002 | Yamaguchi et al. ......... | 701/22 |
| 2002/0188387 A1* | 12/2002 | Woestman et al. .......... | 701/22 |
| 2003/0055558 A1* | 3/2003 | Watanabe et al. ........... | 701/208 |
| 2005/0086227 A1* | 4/2005 | Sullivan et al. ............... | 707/7 |
| 2010/0317485 A1* | 12/2010 | Gillingham et al. .......... | 477/7 |
| 2011/0029179 A1* | 2/2011 | Miyazaki et al. ............ | 701/22 |
| 2011/0140642 A1* | 6/2011 | Kono et al. ................. | 318/139 |
| 2011/0153191 A1* | 6/2011 | Dhanani ..................... | 701/201 |

(Continued)

FOREIGN PATENT DOCUMENTS

| | | |
|---|---|---|
| JP | 2010143258 A | 7/2010 |
| JP | 2010-261398 A | 11/2010 |
| JP | 2011057022 A | 3/2011 |

*Primary Examiner* — Helal A Algahaim
*Assistant Examiner* — Charles J Han
(74) *Attorney, Agent, or Firm* — Mintz Levin Cohn Ferris Glovsky and Popeo, P.C.; Peter F. Corless (57) ABSTRACT

A system and a method of assisting a driver in driving an electric vehicle in a more environmentally efficient manner are disclosed. In particular, an information collecting section collects information operating the electric vehicle and a control logic section generates control logic and models related to route calculation to a destination and operation of the electric vehicle based on the collected information. A route setting section calculates a plurality of travel routes based on the control logic and the model related to the route calculation and sets an optimum travel route having the highest energy efficiency among the plurality of travel routes. A vehicle driving controller monitors the vehicle state and controls driving of the electric vehicle based on the control logic and the model related to the driving of the electric vehicle when the electric vehicle travels along the optimum travel route set by the route setting section.

6 Claims, 3 Drawing Sheets

(56) References Cited

U.S. PATENT DOCUMENTS

2011/0166774 A1* 7/2011 Schunder .................... 701/201
2012/0010768 A1* 1/2012 Phillips et al. ................. 701/22
2012/0053825 A1* 3/2012 Schunder .................... 701/123

* cited by examiner

SYSTEM AND METHOD OF ASSISTING DRIVER IN DRIVING ELECTRIC VEHICLE IN MORE ENVIRONMENTALLY EFFICIENT MANNER

CROSS-REFERENCE TO RELATED APPLICATION

This application claims priority to and the benefit of Korean Patent Application No. 10-2011-0132280 filed in the Korean Intellectual Property Office on Dec. 9, 2011, the entire contents of which are incorporated herein by reference.

BACKGROUND OF THE INVENTION (a) Field of the Invention

The present invention relates to a system and a method of assisting a driver in driving an electric vehicle in a more eco-friendly manner. More particularly, the present invention relates to a system and a method for assisting a driver in driving an electric vehicle in a more environmentally friendly manner based on 3-dimensional road information.

(b) Description of the Related Art

Recently, as oil prices have begun to rise due to depletion of energy resources, the interest in environmentally-friendly driving habits has also increased in an effort to aide in protecting the environment and saving energy resources.

To meet these upcoming demands, electric vehicles and hybrid electric vehicles have been developed and commercialized in automobile industry. In addition, various driving systems and driving equipments using environmentally-friendly driving conditions, habits and features has also begun to immerge in this up and coming market.

In addition, drivers have begun to alter their driving habits or actions to aide in driving efficiency, e.g., setting the cruise control, avoiding quick starts and stops, etc. However, eco driving techniques which minimizes gas exhaust and operate the vehicle on economical fuel consumption consistently cannot be achieved only through the development of vehicle hardware or changes in driving habits. That is, drivers cannot consistently maintain an environmentally friendly driving style due to unexpected variables such as unintentional driving habits of the driver and traffic situations even when the driver understands how to achieve a more environmentally friendly driving style.

Therefore, a system of assisting a driver in achieving optimal eco-driving by providing the driver with information in real-time that is based on road information, vehicle information and driver information is necessary.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system of assisting a driver in driving an electric vehicle in a more environmentally efficient manner having the advantages of providing the driver with information which aides the driver in driving the electric vehicle economically and with minimum energy consumption by using all of existing information that is available while driving the electric vehicle in real-time.

In addition, another embodiment of the present invention provides a method of assisting a driver in driving an electric vehicle in a more environmentally efficient manner having advantages of controlling a driving of the electric vehicle and reducing air pollution by using information provided by an assistance system to the driver.

Technical objects that the present invention will achieve, but are not limited to the above-mentioned technical objects and other technical objects that are not mentioned in this specification can be clearly understood by a person skilled in the art based on the disclosure of the present invention.

A system of assisting a driver in driving an electric vehicle in a more environmentally efficient manner according to an exemplary embodiment of the present invention may include: an information collecting section configured to collect information related to driving the electric vehicle; a control logic section configured to generate control logic and models related to route calculation to a destination and driving of the electric vehicle based on the collected information; a route setting section configured to calculate a plurality of travel routes based on the control logic and the model related to the route calculation and to set an optimum travel route of highest energy efficiency among the plurality of travel routes; and a vehicle driving controller configured to monitor a vehicle state in the electric vehicle and control driving of the electric vehicle based on the control logic and the model related to the driving of the electric vehicle when the electric vehicle travels along the optimum travel route set by the route setting section. More specifically, the route information generated by the route setting section and vehicle control information generated by the vehicle driving controller are transmitted to the information collecting section.

The information collected by the information collecting section may include: vehicle information including vehicle dynamic information, fuel consumption information, battery information, vehicle state information; geographic information including 3-dimensional map information, road information, traffic information; and miscellaneous information, e.g., information other than the vehicle information and the geographic information, and including state information of the driver driving the electric vehicle and weather information during traveling.

The models generated by the control logic section may include at least one of a vehicle dynamic model, a fuel consumption model, a vehicle heat load model, and a vehicle heat energy model corresponding to states of the electric vehicle and environment and a power train control model for driving the electric vehicle on which energy profile according to a lateral wind model is reflected.

The vehicle driving controller may be configured to control driving components of the electric vehicle taking into account of torque efficiency of a motor and an inverter of the electric vehicle, speed limit of a traveling road, and whether a gliding mode is maintained. The vehicle driving controller may also be configured to receive control logic for driving the electric vehicle in the gliding mode from the control logic section.

A method of assisting eco driving of a driver for an electric vehicle according to another exemplary embodiment of the present invention may include: calculating a plurality of travel routes to a destination; requesting a degree of familiarity with the travel routes from a driver by providing the plurality of travel route information to the driver; supplementing 3-dimensional geographic information according to the degree of familiarity of the driver and collecting vehicle state information; calculating a primary road process according to the state of the driver and the electric vehicle and a primary driving schedule corresponding to the primary road process based on the vehicle state information and the geographic information; calculating a secondary road process and a secondary driving schedule corresponding to the secondary road process by reflecting real-time circumstantial information including driver information, real-time weather information and real-time traffic information on the primary road process; selecting an optimum travel route of highest energy efficiency among the plurality of travel routes according to the secondary driving schedule; and monitoring a state of the electric vehicle travelling along the optimum travel route according to the secondary driving schedule and controlling driving of the electric vehicle.

Controlling the driving of the electric vehicle may include: controlling torque efficiency of a motor and an inverter in the electric vehicle travelling along the optimum travel route; controlling a speed of the electric vehicle to be lower than a speed limit when the torque efficiency is greater than or equal to a predetermined reference efficiency; and converting a mode into a gliding mode on a road where non-powered driving is possible among the optimum travel route and controlling the driving of the electric vehicle accordingly.

A vehicle speed may be maintained to be within a predetermined speed range by repeating pulse motoring and turning off motoring and regeneration while controlling the driving of the electric vehicle in the gliding mode.

Furthermore, the plurality of travel route information provided to the driver may be information on road segments divided into a predetermined distance.

DESCRIPTION OF SYMBOLS

10: information collecting section
20: information transmitting/receiving section
30: control logic section
40: route setting section
50: vehicle driving controller
60: vehicle state monitoring section
70: information storing section

DETAILED DESCRIPTION OF THE EMBODIMENTS

Exemplary embodiments of the present invention will be described in detail with reference to the accompanying drawings such that a person skilled in the art can easily practice the present invention. The present invention can be achieved in various forms and is not limited to exemplary embodiments that are described herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, control logic executed by the control units of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although the below exemplary embodiments are described as using a plurality of units to perform the above process, it is understood that the below processes may also be performed by a single controller or unit.

Components that are not directly related to the present invention will be omitted in order to describe the present invention clearly, and the same or similar reference numerals are used for the same or similar constituent elements in the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
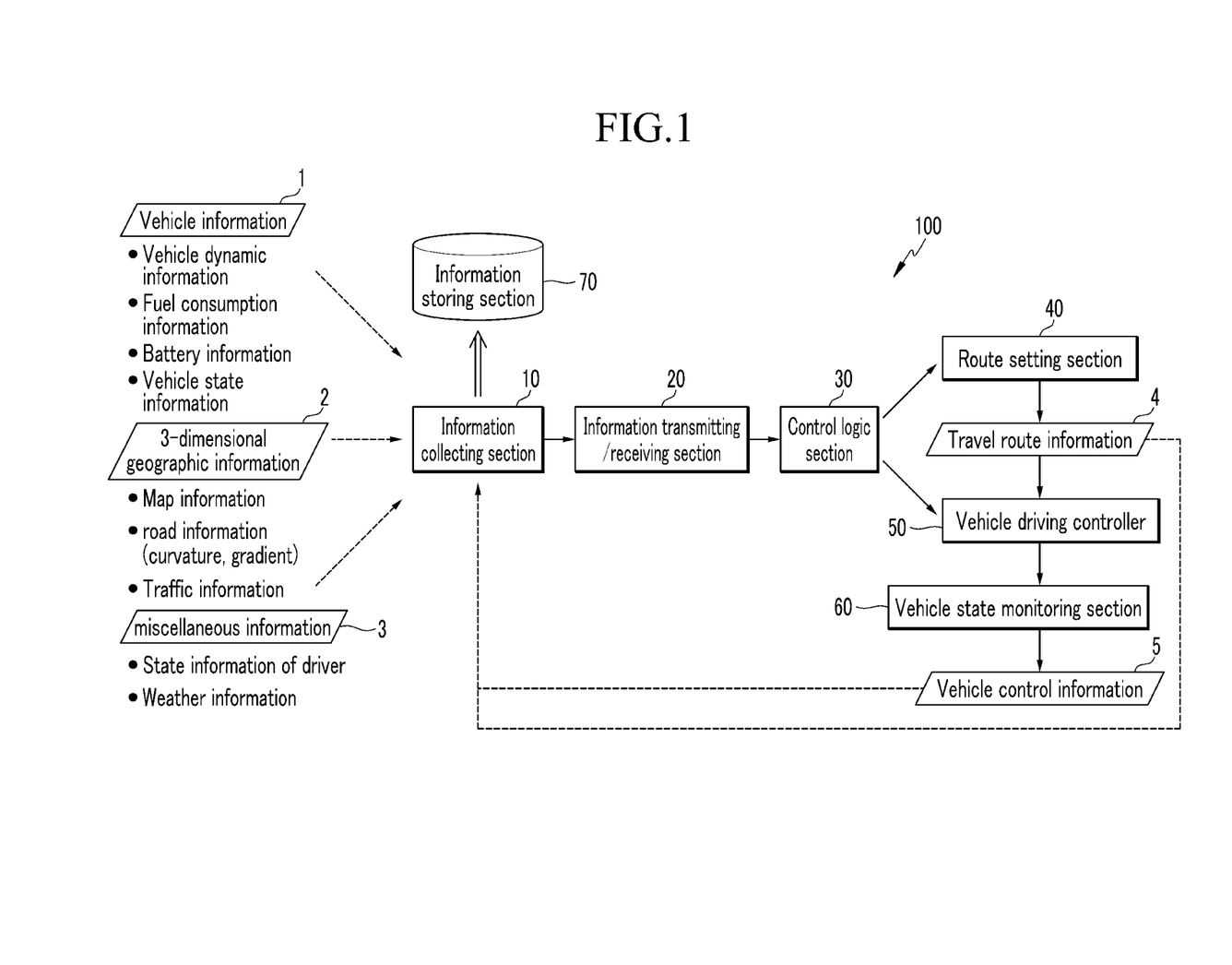
FIG. 1 is a block diagram of a system of assisting eco driving of a driver for an electric vehicle according to an exemplary embodiment of the present invention.

FIG. 1 is a block diagram of a system of assisting a driver in driving an electric vehicle in a more environmentally efficient manner according to an exemplary embodiment of the present invention. Referring to FIG. 1, a system 100 of assisting a driver in driving an electric vehicle in a more environmentally efficient manner (hereinafter, it will be called an "eco driving system") according to an exemplary embodiment of the present invention includes an information collecting section 10, an information transmitting/receiving section 20, a control logic section 30, a route setting section 40, a vehicle driving controller 50 and a vehicle state monitoring section 60. In addition, the eco driving system 100 further includes an information storing section 70 in which information collected by the information collecting section 10 is stored.

The eco driving system shown in FIG. 1 represents an exemplary embodiment of the present invention, and the present invention is not limited to this. Another exemplary embodiment of the present invention may further include constituent elements performing various functions required for assisting the eco driving of the driver of the electric vehicle or removing and integrating some constituent elements.

The information collecting section 10 may be mounted at an exterior of the electric vehicle or may be one of vehicle components in the electric vehicle, and may be configured to collect various information for operating the electric vehicle. Particularly, an exemplary embodiment of the present invention is a system collecting information related to driving the electric vehicle and the electric vehicle itself and providing the information to the driver in order for the driver to perform environmentally-friendly eco driving of the electric vehicle efficiently. The information collected by the information collecting section 10 may be largely divided into vehicle information 1, geographic information 2, and miscellaneous information 3.

The vehicle information 1 may be information related to the driving of the electric vehicle, and includes vehicle dynamic information, fuel consumption information, battery information, and vehicle state information. The vehicle information 1 may be information for displaying energy flow of the electric vehicle in real-time when the electric vehicle runs. The vehicle information 1 can be managed and obtained by a power train and an air conditioning system in the electric vehicle.

The vehicle dynamic information may be information related to past driving records of the electric vehicle, travel distance, the number and timing of uses of the electric vehicle, driving pattern of the vehicle and so on.

The fuel consumption information may be information related to charging amount (power) of the electric vehicle and fuel consumption information recorded for aging and driving efficiency of the electric vehicle.

The battery information may be information on an entire battery system related to main charging and auxiliary charging of the electric vehicle, e.g., information related to the amount of charging and life of a battery.

The vehicle state information may be all information indicating the mechanical state or hardware state related to when the electric vehicle is bought, a vehicle model, records of malfunction and repair, maintenance state, aging of vehicle components, and consuming degree of vehicle consumables.

Meanwhile, the geographic information 2 includes geographical positional information related to the driving of the electric vehicle. The geographic information 2 may be 2-dimensional geographic information and may preferably be 3-dimensional geographic information. That is, the 2-dimensional geographic information is often hard to apply to the eco driving system because it is very difficult to precisely calculate efficiency of energy and fuel consumption during driving the electric vehicle if the overall topology of the terrain is not taken into account. Therefore, the 3-dimensional geographic information including slopes of roads, e.g., a gradient of the roads can be applied to the eco driving system.

The geographic information 2 can be largely divided into map information, road information and traffic information. The map information may represent map data related to positional information of the electric vehicle. The map information may be self-produced road map data or advanced driver assistance system (ADAS) Map data. The road information may be road information stored in the electric vehicle and may include state information on roads on which the electric vehicle travels or will travel, that is, information on 3-dimensional positional information, curvature, gradient, damage, and repair of the roads. The traffic information may include information related to traffic on city roads, country roads and highways, traffic lights, speeding signs, speed limit, positions of speed cameras, positions of traffic cameras, conditions of blocked traffic due to rally or traffic accident and traffic diversion.

The miscellaneous information 3 may be information other than the vehicle information 1 and the geographic information 3, and include state information related to the driver driving the electric vehicle and weather information along the route, etc. The miscellaneous information 3 is not limited to the information described herein and includes all environmental information related to the driving of the electric vehicle.

The state information of the driver includes age, driving experience, driving habits and driving inclination of the driver. The driving inclination of the driver represents whether the driver has active and aggressive driving habits, whether the driver has passive and defensive driving habits, or whether the driver has normal driving habits. The weather information includes real-time weather information or forecasted weather information.

The above information may be information obtained by a detecting means or detection device provided in the electric vehicle or by detecting means or device mounted externally on the electric vehicle or in a remote location, or may be information measured by other institutions. The information may transferred to the eco driving system 100 in the electric vehicle via a wire or wireless communication network and may be collected in the information collecting section 10 provided in the electric vehicle.

Particularly, the vehicle information 1 obtained by the detecting means provided in the electric vehicle is transferred through a communication control system provided in the electric vehicle. High-speed CAN communication, for example, can be used as the communication control system provided in the electric vehicle.

The information is transferred from the information collecting section 10 to the information storing section 70, and is stored and classified in a database of the information storing section 70. In addition, necessary information obtained in the information collecting section 10 is transferred to the control logic section 30 through the information transmitting/receiving section 20. At this time, the necessary information is extracted from data information stored in the information storing section 70 in advance and is transferred to the control logic section 30 through the information transmitting/receiving section 20.

The control logic section 30 is a logic calculating portion that generates control logic required for controlling the driving of the electric vehicle environmentally-friendly and eco-friendly manner by using the transferred information. Since the information transferred to the control logic section 30 is all information including the vehicle information, the geographic information, the state information of the driver, and the weather information related to the external environment, the control logic related to environmentally-friendly travel route or eco driving of the electric vehicle can be calculated by classifying and collecting the information.

In addition, the control logic section 30 can set a vehicle dynamic model, a fuel consumption model, a vehicle heat load model, and a vehicle heat energy model corresponding to states of the electric vehicle and the environment, a power train control model for driving the electric vehicle on which energy profile according to a lateral wind model is reflected, travel route selecting model and a vehicle driving control model by using the control logic.

In further detail, the control logic section 30 may calculate the control logic for selecting an environmentally-friendly optimum route based on the geographic information such as the 3-dimensional map information of the roads on which the electric vehicle will travel and the vehicle information to torque map a motor and an inverter of the electric vehicle. The electric vehicle can travel in regions or on roads having high energy efficiency according to the environmentally-friendly optimum route. In addition, the control logic related to the driving of the electric vehicle for enlarging non-powered driving on flat roads and downhill roads can be calculated. Therefore, driving energy of the electric vehicle can be minimized when the vehicle actually travels on the selected optimum route.

The route setting section 40 can set the optimum route suitable for the eco driving by using the control logic or predetermined models for the eco driving calculated by the control logic section 30. The vehicle driving controller 50 controls operation of the driving components of the electric vehicle to control the speed of the electric vehicle and the heat load of the driving components of the electric vehicle while the electric vehicle is being driven. Particularly, the vehicle driving controller 50 can control the power train in the electric vehicle actively by using the control logic for driving the electric vehicle calculated by the control logic section 30.

The route setting section 40 may generate at least two preliminary optimum travel routes according to a destination set by the driver and select an environmentally-friendly travel route having optimized energy efficiency by using energy flow information based on the vehicle state information obtained while driving the electric vehicle, driving resistance information calculated based on the weather information, and driver inclination pattern information. Such travel route information 4 may be transferred to the vehicle driving controller 50 and applied to the control model for the driving of the electric vehicle.

The vehicle driving controller 50 controls the operation of the driving components to minimize consumption of electrical energy in the electric vehicle while traveling on a route based on the control logics and the model information transferred from the control logic section 30 calculating control logic and models for the eco driving of the electric vehicle and the transferred travel route information 4. Since the driving components operates according to control values for the driving components calculated by the vehicle driving controller 50, consumption of energy of the electric vehicle may be reduced when the electric vehicle actually travels on the environmentally-friendly travel route.

Meanwhile, the vehicle state monitoring section 60 checks whether the driving components of the electric vehicle are operating normally according to control of the vehicle driving controller 50. The vehicle state monitoring section 60 can obtain vehicle travel information, e.g., information on speed, heat load of the driving components, driving torque, loss or abrasion of the driving components, and driving power consumption when the driving components of the electric vehicle are operated according to control values. Therefore, the control values of the driving components of the electric vehicle or the vehicle travel information according thereto can be obtained as the vehicle control information 5 when the vehicle actually travels on the road. The vehicle control information 5 is transferred back to the information collecting section 10.

The system of assisting eco driving of the driver for the electric vehicle according to an exemplary embodiment of the present invention shown in FIG. 1 can generate route information by using algorithm for calculating minimum distance applied to a conventional navigation system. In addition, the system according to an exemplary embodiment of the present invention can operate the logics for selecting environmentally-friendly and eco-friendly optimum travel route to the destination based on the 3-dimensional geographic information, the weather information, and the driver state information after a plurality of routes is selected.

Further, the system according to an exemplary embodiment of the present invention can operate the logic for selecting driving type and operating type of the electric vehicle and driving control type of the driving components of the electric vehicle to minimize energy consumption of the electric vehicle based on the vehicle information, the 3-dimensional geographic information to the destination, the driver state information, and the weather information, and control driving of the electric vehicle according to the executed logic. Therefore, energy flow in the electric vehicle can be analyzed in real-time and the vehicle can travel along the optimum route.

When the system of a driver in driving an electric vehicle in a more environmentally efficient manner according to an exemplary embodiment of the present invention is used, energy consumption may be minimized. Therefore, fuel consumption when the vehicle is actually traveling on the road may be improved by e.g., 4-7% or travel distance of the electric vehicle may be increased by, e.g., 4-7%.

Figure 2:
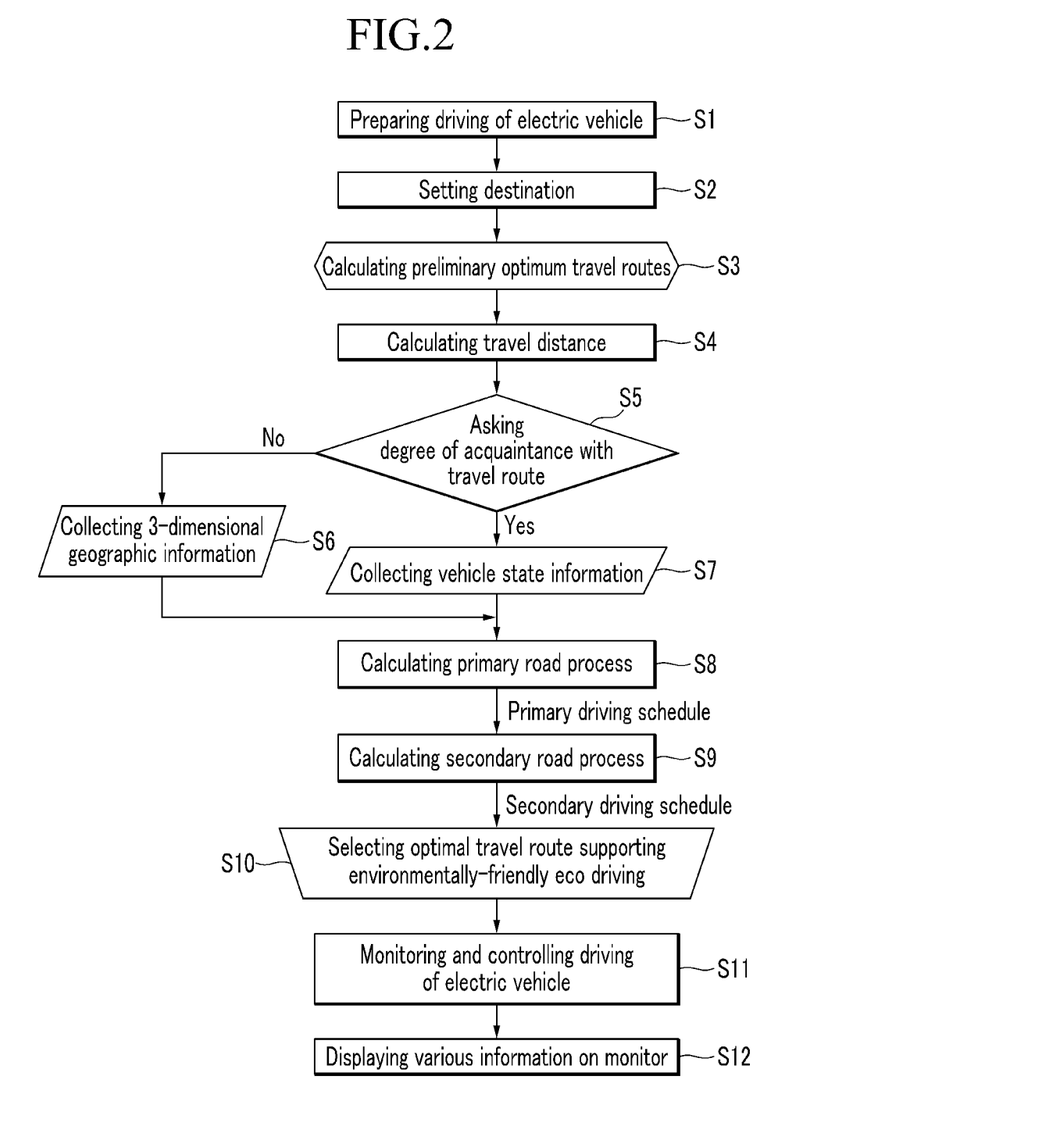
FIG. 2 is a flowchart of a method of assisting eco driving of a driver for an electric vehicle according to an exemplary embodiment of the present invention.
Figure 3:
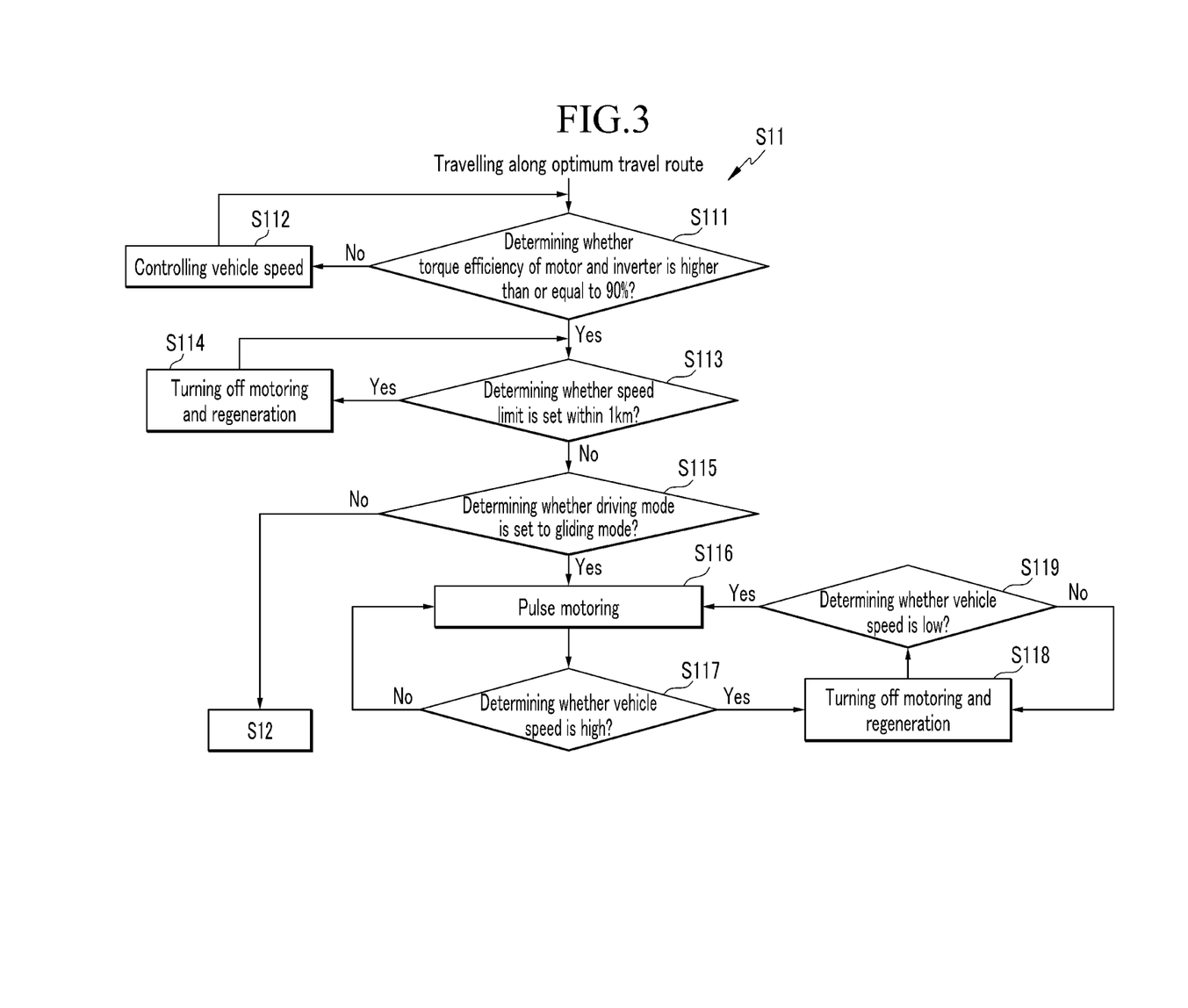
FIG. 3 is a flowchart of monitoring and controlling a driving of an electric vehicle according to an exemplary embodiment of the present invention.

FIG. 2 is a flowchart of a method of assisting eco a driver in driving an electric vehicle in a more environmentally efficient manner according to an exemplary embodiment of the present invention, and FIG. 3 is a flowchart of monitoring and controlling a driving of an electric vehicle according to an exemplary embodiment of the present invention.

The flowcharts shown in FIG. 2 and FIG. 3 show a method for assisting a driver in driving an electric vehicle in a more environmentally efficient manner by using the system shown in FIG. 1.

When the driver is preparing to drive an electric vehicle in step S1, the system according to an exemplary embodiment of the present invention requires the driver set the destination at step S2. Once the driver sets the destination, the route setting section of the eco driving system calculates the preliminary optimum travel routes by using an algorithm for calculating minimum travel distance in step S3 and calculates the travel distance for each preliminary optimum travel route in step S4. The preliminary optimum travel routes are divided into a plurality of road segments and are provided to the driver. For example, the preliminary optimum travel routes may be divided into 10 m-20 m segments so that the road segments are generated accordingly.

Once a plurality of road segments of the preliminary optimum travel routes are provided to the driver, the system requests that the driver enter his or her degree of familiarity with the road segment at step S5. That is, the system determines whether the road segments are familiar roads to the driver, whether the road segments consist of a commuting road, and whether the road segments are within a residential district, and the system determines the degree of familiarity of the driver with the road segments based on this information.

When the road segments consisting of the travel route are familiar to the driver, the information collecting section 10 collects the vehicle state information at step S7. The vehicle state information is information on non-powered driving, regenerative braking, and powered driving of the electric vehicle, and operation of the air conditioning system for lowering driving power consumption of the electric vehicle.

In addition, when the road segments consisting of the travel route are not familiar to the driver, the information collecting section 10 collects the 3-dimensional geographic information at step S6. The 3-dimensional geographic information collected at the step S6 is supplemental information for providing vicinity geographic information to the driver when the optimum travel route that is not familiar to the driver is selected.

When the vehicle state information and the 3-dimensional geographic information are collected, the control logic section generates route setting models and vehicle driving control models in the eco driving system based on the information. A primary road process according to the driver and the vehicle state is calculated based on the models at step S8. In addition, a primary driving schedule is provided to the driver via the primary road process. The driving schedule may be information related to speed, position, and energy saving driving of the electric vehicle that are provided to the driver of the environmentally-friendly eco driving when the electric vehicle travels to the destination along the optimum route. After the driving schedule is calculated primarily at the step S8, a secondary road process corresponding to supplemental state information is calculated at step S9.

The supplemental state information may be information related the driver himself or herself such as driving habits and the driving inclination of the driver, real-time weather information or real-time traffic information. At this time, the real-time weather information may include data related to real-time wind direction and wind speed and circumstantial information of the roads along the travel route.

Since the real-time circumstantial information is reflected on the secondary road process set at the step S9, at least some portion of the secondary driving schedule obtained using the secondary road process may be different from the primary driving schedule.

The method shown in FIG. 2 is just one exemplary embodiment of the present invention. Therefore, the present invention is not limited to the exemplary embodiment shown in FIG. 2. That is, the driving schedule can be obtained by calculating an integrated road process in one step.

When the secondary driving schedule is obtained, the optimum travel route which supports the environmentally-friendly eco driving can be selected among the preliminary optimum travel routes in step S10. That is, since the information related to the electric vehicle and the driver, the geographic information and the real-time circumstantial information are reflected on the optimum travel route set at the step S10, the optimum travel route set at the step S10 is the environmentally-friendly travel route that optimizes energy efficiency.

When the vehicle travels along the optimum travel route, a state of the electric vehicle is monitored and the operation of the electric vehicle is controlled in real-time at step S11. The step S11 will be described in detail referring to FIG. 3.

Referring to FIG. 3, when the electric vehicle travels along the optimum travel route, it is determined whether torque efficiency is greater than or equal to 90% from a torque map of a motor and an inverter at step S111. 90% torque efficiency is set so as to secure suitable energy efficiency of the electric vehicle, but the predetermined torque efficiency is not limited to 90%.

The step S111 is an example of monitoring energy flow of the electric vehicle, but the monitoring method is not limited to the method of step S111. That is, a monitoring method where the vehicle state is monitored to identify energy flow while operating the electric vehicle and it is determined whether the vehicle state exceeds a predetermined appropriate range may be used at the step S111.

When the torque efficiency is lower than 90%, the vehicle speed is controlled at step S112. That is, the components related to the speed of the electric vehicle are controlled in an effort to control the vehicle speed. Particularly, components such as an engine, the main motor, and the inverter are actively controlled and torque efficiency information is continuously obtained and monitored. Thereby, the electric vehicle can be controlled to drive in a region where torque efficiency is greater than or equal to a predetermined standard (e.g., 90%). In one or more exemplary embodiments, the route along which the electric vehicle travels with the torque efficiency of the motor and the inverter of 90% or higher may be displayed on a monitor of the navigation system so as to be provided to the driver.

Meanwhile, when the torque efficiency of the motor and the inverter is greater than or equal to the predetermined standard, a speed limit may be set ahead of the electric vehicle within a predetermined distance (e.g., 1 Km) at step S113. At this time, the predetermined distance can be set by the driver according the driving habits and driving inclination of the driver.

When the speed monitoring camera is mounted on the road and monitors the vehicle speed, motoring and regeneration is turned off to reduce the current vehicle speed to be less than or equal to the speed limit at step S114. In this case, the electric vehicle drives at non-powered state and is decelerated accordingly.

When the speed limit is not set, it is determined whether a driving mode of the electric vehicle is set to a gliding mode where the electric vehicle runs using kinetic energy of the electric vehicle at step S115. The gliding mode is one of the driving modes of the electric vehicle used for increasing non-powered driving on flat roads and downhill.

When the electric vehicle, however, must run using power, the gliding mode is not set and the method proceeds to step S12 in FIG. 2. Therefore, various information related to the eco driving of the electric vehicle may be displayed on the monitor at the step S12.

When the gliding mode where non-powered driving is possible is set, the electric vehicle runs by repeating step S116 of pulse motoring and step S118 of turning off motoring and regeneration. That is, it is determined whether the vehicle speed is greater than or equal to a predetermined speed at step S117, and the motoring and the regeneration are turned off to increase the non-powered driving while the electric vehicle runs with high-speed. In addition, while the electric vehicle does not operate at high-speeds, pulse motoring is performed.

When the motoring and the regeneration are turned off and the electric vehicle runs without power in the step S118, the speed of the electric vehicle may be reduced greatly due to frictional force between the electric vehicle and the road. Therefore, it is determined whether the vehicle speed is less than a predetermined standard speed at step S119. When the vehicle speed is less than the predetermined standard speed, the pulse motoring is performed again at the step S116 to increase the vehicle speed. In addition, when the vehicle speed is greater than or equal to the predetermined standard speed, the motoring and the regeneration are turned off continuously to maintain the non-powered driving.

Since the vehicle speed is maintained between an upper speed and a lower speed by repeating the gliding mode, the non-powered driving of the electric vehicle may be greatly increased on the optimized travel route selected for the environmentally-friendly eco driving. Therefore, driving power consumption may be minimized and the electric vehicle may be driven eco-friendly.

According to an exemplary embodiment of the present invention, the driving of the electric vehicle may be controlled by using variables occurring while the electric vehicle is being operated, the 3-dimensional road information, the driver information, and the vehicle information. Therefore, fuel economy of the electric vehicle may be improved efficiently. Particularly, since the system assists the driver in real-time, the driving of the electric vehicle may be controlled in an environmentally-friendly manner. Therefore, travel distance of the electric vehicle per unit of power may be greatly increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of assisting a driver in driving an electric vehicle in an environmentally efficient manner, comprising:
   calculating, by a control unit, a plurality of travel routes to a destination;
   requesting from the driver by the control unit, a degree of familiarity with the travel routes of each of the plurality of travel route information calculated by the control unit;
   supplementing, by the control unit, 3-dimensional geographic information based on the driver's particular degree of familiarity and collecting vehicle state information;
   calculating, by the control unit, a primary road process according to states of the driver and the electric vehicle and a primary driving schedule corresponding to the primary road process based on the vehicle state information and the geographic information;
   calculating, by the control unit, a secondary road process and a secondary driving schedule corresponding to the secondary road process by reflecting real-time circumstantial information including driver information, real-time weather information and real-time traffic information on the primary road process;
   selecting an optimum travel route having the highest energy efficiency among the plurality of travel routes according to the secondary driving schedule; and
   monitoring a state of the electric vehicle travelling along the optimum travel route according to the secondary driving schedule and controlling driving of the electric vehicle,
   wherein controlling the driving of the electric vehicle comprises:
      controlling torque efficiency of a motor and an inverter in the electric vehicle travelling along the optimum travel route;
      controlling a speed of the electric vehicle to be less than a speed limit when the torque efficiency is greater than or equal to a predetermined reference efficiency; and
      converting a mode into gliding mode on a road where non-powered driving is possible among the optimum travel route and controlling the driving of the electric vehicle.

2. The method of claim 1, wherein a vehicle speed is maintained to be within a predetermined speed range by repeating pulse motoring and turning off motoring and regeneration at the controlling the driving of the electric vehicle while in the gliding mode.

3. The method of claim 1, wherein the plurality of travel route information provided to the driver is information on road segments divided into a predetermined distance.

4. A non-transitory computer readable medium containing program instructions executed by a processor or controller, the computer readable medium comprising:
   program instructions that calculate a plurality of travel routes to a destination;
   program instructions that calculate request from the driver a degree of familiarity with the travel routes of each of the plurality of travel route information calculated by the control unit;
   program instructions that supplement geographic information based on the driver's particular degree of familiarity and collecting vehicle state information;
   program instructions that calculate a primary road process according to states of the driver and the electric vehicle and a primary driving schedule corresponding to the primary road process based on the vehicle state information and the geographic information;
   program instructions that calculate a secondary road process and a secondary driving schedule corresponding to the secondary road process by reflecting real-time circumstantial information including driver information, real-time weather information and real-time traffic information on the primary road process;
   program instructions that select an optimum travel route having the highest energy efficiency among the plurality of travel routes according to the secondary driving schedule; and
   program instructions that monitor a state of the electric vehicle travelling along the optimum travel route according to the secondary driving schedule and controlling driving of the electric vehicle,
   wherein the program instructions that control the driving of the electric vehicle comprise:
      program instructions that control torque efficiency of a motor and an inverter in the electric vehicle travelling along the optimum travel route;
      program instructions that control a speed of the electric vehicle to be less than a speed limit when the torque efficiency is greater than or equal to a predetermined reference efficiency; and
      program instructions that convert a mode into a gliding mode on a road where non-powered driving is possible among the optimum travel route and control the driving of the electric vehicle.

5. The non-transitory computer readable medium of claim 4, wherein a vehicle speed is maintained to be within a predetermined speed range by repeating pulse motoring and turning off motoring and regeneration at the controlling the driving of the electric vehicle while in the gliding mode.

6. The non-transitory computer readable medium of claim 4, wherein the plurality of travel route information provided to the driver is information on road segments divided into a predetermined distance.

* * * * *